United States Patent
Cattone

(10) Patent No.: US 10,204,340 B2
(45) Date of Patent: Feb. 12, 2019

(54) AUTOMOTIVE OPTICAL COMMUNICATION SYSTEM

(71) Applicant: PAYPAL, INC., San Jose, CA (US)

(72) Inventor: Jeremy L. Cattone, Tigard, OR (US)

(73) Assignee: PayPal, Inc., San Jose, CA (US)

(*) Notice: Subject to any disclaimer, the term of this patent is extended or adjusted under 35 U.S.C. 154(b) by 622 days.

(21) Appl. No.: 14/586,445

(22) Filed: Dec. 30, 2014

(65) Prior Publication Data

US 2016/0189146 A1 Jun. 30, 2016

(51) Int. Cl.

| | |
|---|---|
| *H04L 29/06* | (2006.01) |
| *G06Q 20/38* | (2012.01) |
| *G07C 5/00* | (2006.01) |
| *H04L 29/08* | (2006.01) |
| *H04B 10/112* | (2013.01) |
| *H04W 4/04* | (2009.01) |
| *G06Q 20/32* | (2012.01) |
| *H04B 10/114* | (2013.01) |

(52) U.S. Cl.
CPC ......... *G06Q 20/3829* (2013.01); *G06Q 20/32* (2013.01); *G06Q 20/3821* (2013.01); *G07C 5/008* (2013.01); *H04B 10/1123* (2013.01); *H04B 10/1143* (2013.01); *H04L 67/2823* (2013.01); *H04W 4/046* (2013.01); *G06Q 2220/00* (2013.01)

(58) Field of Classification Search
CPC . G07C 5/008; H04L 67/2823; H04B 10/1123; H04B 10/1143; H04W 4/046; G06Q 20/32; G06Q 20/3821; G06Q 2220/00
See application file for complete search history.

(56) References Cited

U.S. PATENT DOCUMENTS

| | | |
|---|---|---|
| 5,488,360 A | 1/1996 | Ray |
| 2005/0001028 A1 | 1/2005 | Zuili |

(Continued)

FOREIGN PATENT DOCUMENTS

JP 2014049785 * 3/2014 .......... H04B 10/116

OTHER PUBLICATIONS

T. Schaal, T. Kibler, and E. Zeeb, "Optical communication systems for automobiles," in Eur. Conf. Optical Commun.(ECOC) Stockholm, Sweden, 2004, 4 Pages.

*Primary Examiner* — Harunur Rashid
(74) *Attorney, Agent, or Firm* — Haynes and Boone, LLP

(57) ABSTRACT

Systems and methods for providing optical communication between a vehicle and an external actor include a system provider device that establishes, through communication over a network with at least one vehicle, the at least one vehicle as a communication proxy. Establishing the at least one vehicle as a communication proxy may include pairing the at least one vehicle with a user device. In various embodiments, the system provider also receives a communication trigger. In response to the communication trigger, the system provider may transmit a modulated optical signal via an illumination source of one of the at least one vehicle and an external actor, to the other of the at least one vehicle and the external actor. The system provider detects, at the other of the at least one vehicle and the external actor, the modulated optical signal and demodulates the transmitted optical signal.

21 Claims, 15 Drawing Sheets

(56) References Cited

U.S. PATENT DOCUMENTS

| | | | |
|---|---|---|---|
| 2010/0057624 A1* | 3/2010 | Hurt | G06Q 20/20 |
| | | | 705/76 |
| 2011/0136429 A1* | 6/2011 | Ames | H04B 5/02 |
| | | | 455/41.1 |
| 2013/0226511 A1* | 8/2013 | Troxler | A01K 15/023 |
| | | | 702/150 |
| 2013/0282283 A1* | 10/2013 | Bondesen | H04W 12/06 |
| | | | 701/537 |
| 2013/0346165 A1 | 12/2013 | Hedley et al. | |
| 2015/0263808 A1* | 9/2015 | Kondo | H04B 10/116 |
| | | | 398/115 |

* cited by examiner

AUTOMOTIVE OPTICAL COMMUNICATION SYSTEM

BACKGROUND

Field of the Invention

The present disclosure generally relates to optical communication systems, and more particularly to an automotive optical communication system that may be used to provide communication between a car and any of a plurality of mobile or stationary transceivers.

Related Art

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider such as, for example, PayPal, Inc. of San Jose, Calif. Such payment service providers can make transactions easier and safer for the parties involved. Purchasing with the assistance of a payment service provider from the convenience of virtually anywhere using a mobile device is one main reason why on-line and mobile purchases are growing very quickly.

Moreover, people are becoming quite accustomed to always being connected (e.g., to the Internet), for example via their mobile devices, and thus having communication options (e.g., phone calls, text messaging, etc.), information options (e.g., via a web browser), and payment options (e.g., via a payment service provider) always readily available. In the automotive industry, in-vehicle infotainment (IVI) systems (e.g., which may provide entertainment, safety and maintenance information, communication options, and navigation) are both an area of challenge and opportunity for new ways of keeping people connected. In some examples, a vehicle's infotainment system may connect to a driver's mobile device, thereby allowing the driver to use voice commands to control vehicle systems (e.g., radio, navigation, climate control, etc.) as well as interact with their mobile device (e.g., to read and/or send text messages, make phone calls, etc.).

Despite the advances of such in-vehicle systems, external vehicle communication (e.g., vehicle-to-vehicle, vehicle-to-fixed point, etc.) has remained hindered in part by the use of radio-based communication, which may be limited in range due to power, technology, and/or spectrum limitations. Where external vehicle communication systems do exist, they often require additional dedicated and/or paired hardware, at an additional cost. As one example, radio-frequency identification (RFID) tags (e.g., toll tags), which can be costly devices, are often installed onto a vehicle as a method of communicating with a toll booth as the vehicle passes near the toll booth, resulting in a charge to a driver's toll tag account. In addition to the additional cost of such toll tags, their operable range is often limited, as described above. Moreover, the information such RFID tags provide is generally limited to data used for identification and/or tracking purposes.

Thus, there is a need for an automotive optical communication system that may be used to provide external vehicle communication (e.g., vehicle-to-vehicle, vehicle-to-fixed point, etc.) which leverages existing vehicle lighting systems while also providing customers (e.g., including drivers), merchants, account providers, payment providers, and others that may be involved in a purchase transaction with a reliable way to communicate and complete such transactions through an optical communication channel in a low-cost manner, at a distance, and in some cases, while a vehicle is in motion.

Figure 1:
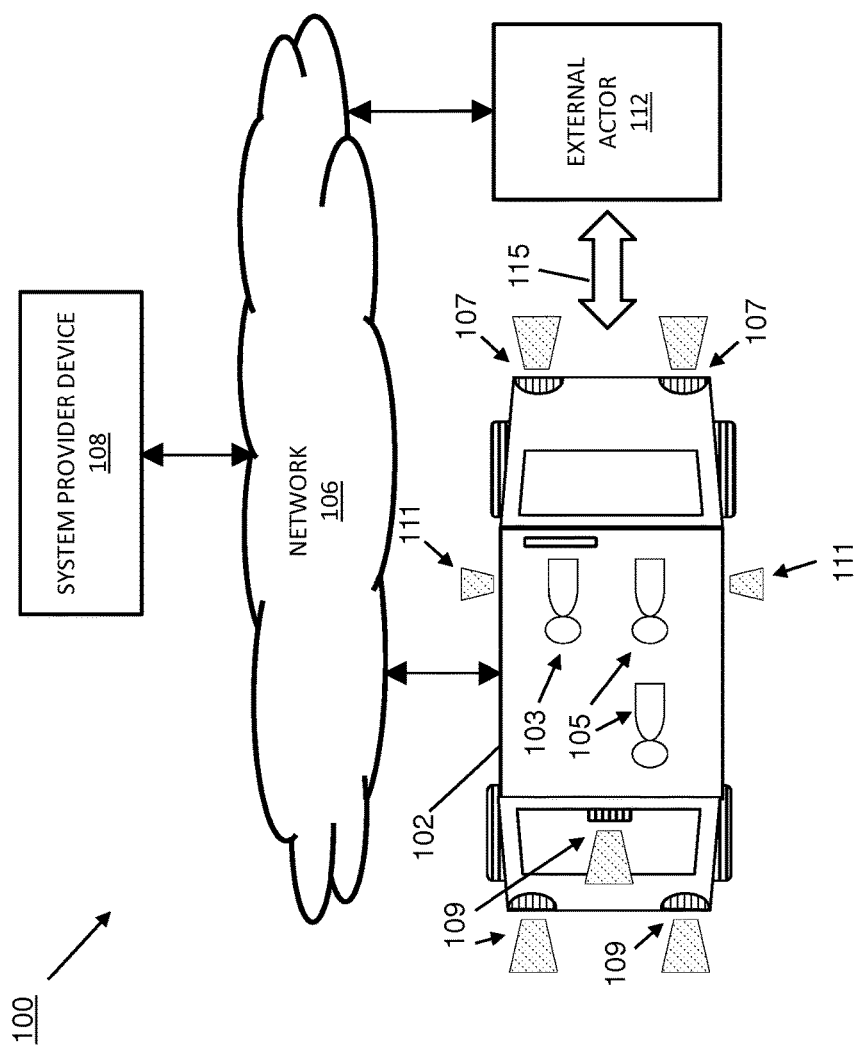
FIG. 1 is a schematic view illustrating an embodiment of an automotive optical communication system.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides systems and methods for providing external vehicle communication (e.g., vehicle-to-vehicle, vehicle-to-fixed point, etc.) using existing vehicle lighting systems. In some embodiments, the optical communication systems and methods described herein may be used to provide customers (e.g., drivers and/or passengers), merchants, account providers, payment providers, and others that may be involved in a purchase transaction with a reliable way to communicate and complete a purchase transaction through an optical communication channel in a low-cost manner, at a distance, and in some cases, while a vehicle is in motion. In some examples, the systems and method described herein may be used to gather and/or report vehicle telematics, for example, to communicate navigation information (e.g., between cars) and avoid potential hazardous situations. In other examples, road closures, detours, construction, accidents, or other such information may be communicated to any of a number of vehicles, in accordance with some embodiments. In yet other examples, one or more of the systems and methods described herein may be used to communicate sensor and/or diagnostic information. In the embodiments described herein, any of a plurality of different types of payloads may be transmitted via the systems and methods described below. As used herein, the term "payload" refers to the information transmitted via the optical communication systems described herein, such as purchase transaction information which may include payment information, vehicle telematics, authorization information, sensor and/or diagnostic information, road and/or traffic information, identification and/or registration information, and any other type of information as known in the art. While a few examples of different types of payloads have been described, one of skill in the art will recognize other payload types which may be communicated via the automotive optical communication systems and methods described herein, while remaining within the scope of the present disclosure.

Referring now to FIG. 1, an embodiment of an automotive optical communication system 100 is illustrated. The automotive optical communication system 100 includes a vehicle 102 having a plurality of external illumination sources. For example, as shown in FIG. 1, the vehicle 102 may include forward illumination sources 107, rear illumination sources 109, and lateral illumination sources 111. By way of example, the forward illumination sources 107 may include any of a plurality of headlamps (e.g., used as low-beam and/or high-beam illumination sources) such as a tungsten headlamp, a tungsten-halogen headlamp, a halogen headlamp, a halogen infrared reflective (HIR) headlamp, a high-intensity discharge (HID) headlamp, a light-emitting diode (LED) headlamp, and/or a high-intensity LED headlamp, among others as known in the art. In some embodiments, the forward illumination sources 107 may also include auxiliary illumination sources such as driving lamps, front fog lamps, cornering lamps, parking lamps, daytime running lamps, and/or turning lamps (e.g., turn signals), among others as known in the art. In some cases, the forward illumination sources 107 may include infrared (IR) lamps which may be particularly useful during adverse weather conditions (e.g., fog, rain, etc.). For purposes of illustration, the rear illumination sources 109 may include any of a plurality of lamps such as rear position lamps (e.g., tail lamps), stop lamps (e.g., brake lamps), center high-mount stop lamps (e.g., third brake lamps), rear fog lamps, reversing lamps (e.g., backup lamps), and/or a license plate lamp, among others as known in the art. In various embodiments, the lateral illumination sources 111 may include side marker lamps, turning lamps (e.g., turn signals), and/or other lateral lamps as known in the art. In some examples, the rear illumination sources 109 and the lateral illumination sources 111 may include a filament lamp, an LED lamp, an IR lamp, and/or other type of lamp as known in the art.

In various embodiments, any of the forward, rear, and/or lateral illumination sources 107, 109, 111 may be used to convey any of a plurality of payloads, as described above, via an optical communications channel for example, by any of a plurality of optical modulation techniques, as discussed below. Thus, in various examples, the vehicle 102 may be configured to, by any of the forward, rear, and/or lateral illumination sources 107, 109, 111, transmit any of a plurality of payloads to any of a plurality of external actors, such as an external actor 112. As used herein, the terms "external actor" and "external actors" are used to describe vehicles, merchants, toll booths, road signs, service stations, and generally any source of and/or recipient of information (e.g., optically transmitted information) which are external to the vehicle 102. In some embodiments, one or more sensors such as an electro-optical sensor, an IR sensor, an LED sensor, a photodetector, a photodiode, and/or other type of sensor may be included, for example integrated with or adjacent to, any of the forward, rear, and/or lateral illumination sources 107, 109, 111. Thus, in various examples, the vehicle 102 may be configured to, by the one or more sensors, receive any of a plurality of payloads from any of a plurality of external actors, such as the external actor 112.

While the example of FIG. 1 is shown and described with reference to a single vehicle and a single external actor for the sake of clarity, it will be understood that various embodiments may include any number of other vehicles or external actors which are sources of and/or recipients of information exchanged with the vehicle 102. In various examples, the vehicle 102 includes one or more vehicle network communication devices that are coupled to a network 106 that is further coupled to a system provider device 108. In various embodiments, the vehicle 102 and the system provider device 108 are configured to communicate with one another by way of the network 106, for example by way of network communication devices, as discussed below.

The network 106 may be implemented as a single network or a combination of multiple networks. For example, in various embodiments, the network 106 may include the Internet and/or one or more intranets, landline networks, wireless networks, cellular networks, satellite networks, and/or other appropriate types of networks. In some examples, the vehicle 102, may communicate through the network 106 via cellular communication, by way of one or more vehicle network communication devices. In other examples, the vehicle 102 may communicate through the network 106 via wireless communication (e.g., via a WiFi network), by way of one or more vehicle network communication devices. In yet other examples, the vehicle 102 may communicate through the network 106 via any of a plurality of other radio and/or telecommunications protocols, by way of one or more vehicle network communication devices. In still other embodiments, the vehicle 102 may communicate through the network 106 using a Short Message Service (SMS)-based text message, by way of one or more vehicle network communication devices. In a similar manner, in various embodiments, the external actor 112 may couple to the network 106 via a wired or wireless connection.

The system provider device 108 may likewise couple to the network 106 via a wired or wireless connection. As described in more detail below with reference to FIG. 14, the system provider device 108 may include an optical communication engine, a communication engine, a vehicle database, and an external actor database. Software or instructions stored on a computer-readable medium, and executed by one or more processors of the system provider device 108, allows the system provider device 108 to send and receive information over the network 106. Furthermore, the optical communication engine in the system provider device 108 may be configured to implement the various embodiments of the automotive optical communication system as described herein. In some examples, the system provider device 108 is configured to facilitate a transmission 115 of any of a plurality of payloads between a vehicle (e.g., the vehicle 102) and any of a plurality of external actors (e.g., the external actor 112).

In the embodiment illustrated in FIG. 1, a driver 103 and one or more passengers 105 may be traveling in the vehicle 102. The entry into and/or exit from the vehicle 102, as well as a position of the driver and passengers 103, 105 may be detected by way of one or more beacon devices in a beacon system, as discussed below. In some embodiments, the system provider may include a payment service provider such as, for example, PayPal Inc. of San Jose, Calif., that provides the automotive optical communication system 100 for the vehicle 102, as well as for any external actors (e.g., the external actor 112) which are implementing the automotive optical communication system 100. In some embodiments, the payment service provider transmits and/or receives purchase transaction information communicated between the vehicle 102 and any of a plurality of external actors such as the external actor 112. In some embodiments, as discussed below, the payment service provider processes payment requests from the vehicle 102, processes payments from customers (e.g., driver and/or passengers 103, 105) to a merchant, and may associate a merchant physical location (or its merchant), a customer location (or its customer), merchant devices, customer devices, and/or other components of the automotive optical communication system 100 with a merchant account in a database located in a non-transitory memory. For example, the payment service provider may use a payment service provider device to transfer funds from a customer payment account (e.g., provided by an account provider through an account provider device, provided by the payment service provider through the payment service provider device, etc.) of the customer to a merchant payment account (e.g., provided by an account provider through an account provider device, provided by the payment service provider through the payment service provider device, etc.) of the merchant to provide payment from the customer to the merchant during a transaction.

In addition, in some embodiments, the system provider and/or payment provider may provide an encryption key via the network 106 to the vehicle 102 or to the external actor 112, with which the vehicle 102 optically communicates (e.g., via the forward, rear, or lateral illumination sources 107, 109, 111). In one example, discussed in more detail below, a payload is signed by a transmitting vehicle (or external actor), using the provided encryption key, and the encrypted payload is unencrypted by a receiving vehicle (or receiving external actor). Such use of encryption key signing of payloads is useful, for example, for the avoidance of unintentional signaling of another vehicle or another external actor, as well as for maintaining a secure communications environment, particularly when transmitting and/or receiving purchase transaction information.

Information sent and received through the network 106, the vehicle 102, the external actor 112, merchant devices, and customer devices may be associated with merchant and/or customer accounts in the database, and any use of that information may be stored in association with such merchant and/or customer accounts. Furthermore, the payment service provider may provide the automotive optical communication system 100 for a plurality of different merchants, including a plurality of other external actors, at various physical locations which may communicate with any of a plurality of vehicles, such as the vehicle 102, as described herein. Thus, references to a system provider operating a system provider device below may refer to a payment service provider operating a payment service provider device, or may refer to any other entity providing an automotive optical communication system separate from or in cooperation with a payment service provider.

While various embodiments are described herein with reference to purchase transactions including customer/merchant interactions, in other embodiments, the system provider device 108 may be configured to provide other embodiments of the automotive optical communication system 100. For example, in some cases, the information transmitted and/or received by the vehicle 102 may include vehicle telematics, authorization information, sensor and/or diagnostic information, road and/or traffic information, identification and/or registration information, and any other type of information as known in the art. Illustrative examples of some embodiments of the present disclosure are discussed below with reference to FIGS. 6-10.

Figure 2:
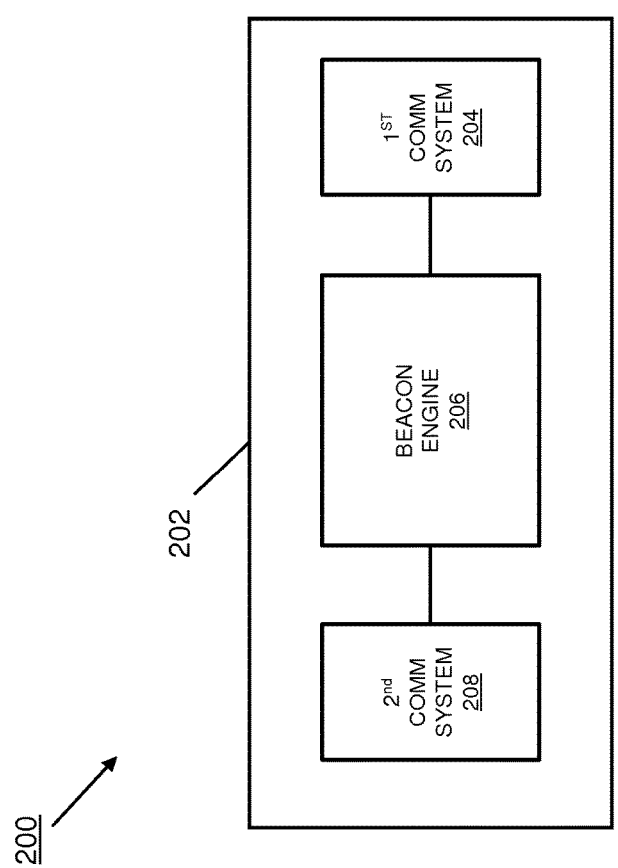
FIG. 2 is a schematic view illustrating an embodiment of a beacon device.

Referring now to FIG. 2, an embodiment of a beacon device 200 is illustrated. The beacon device 200 includes a chassis that houses a first communications system 204 such as, for example, a WiFi communications system, a cellular communication system, and/or a variety of other communication systems known in the art. The first communications system 204 is coupled to a beacon engine 206 that may be provided by instruction on a memory system (not illustrated) in the beacon device 200 that, when executed by a processing system (not illustrated) in the beacon device 200, causes the processing system to perform the functions of the beacon device 200 discussed below. The beacon engine 206 is coupled to a second communication system 208 such as, for example, a Bluetooth® Low Energy (BLE) communication system, a BLE direct communication system, a Near Field Communication (NFC) system, and/or a variety of other communication systems known in the art. The beacon engine 206 may be configured to receive any of a variety of sensor signals through the second communication system 208 and transmit those sensor signals using the first communication system 204. While a few examples of communications components in the beacon device 200 have been described, one of skill in the art will recognize that other communications devices, as well as other components that have been omitted for clarity of discussion and illustrated, may be included in the beacon device 200 and will fall within the scope of the present disclosure. One of skill in the art will recognize that the components described above allow for the beacon device to be provided in a relatively small form factor such that it may be placed inconspicuously almost anywhere. As such, the chassis 202 of the beacon device 200 may include any of a variety of features that allow for the coupling of the beacon device to any part of a vehicle, such as the vehicle 102.

Figure 3A:
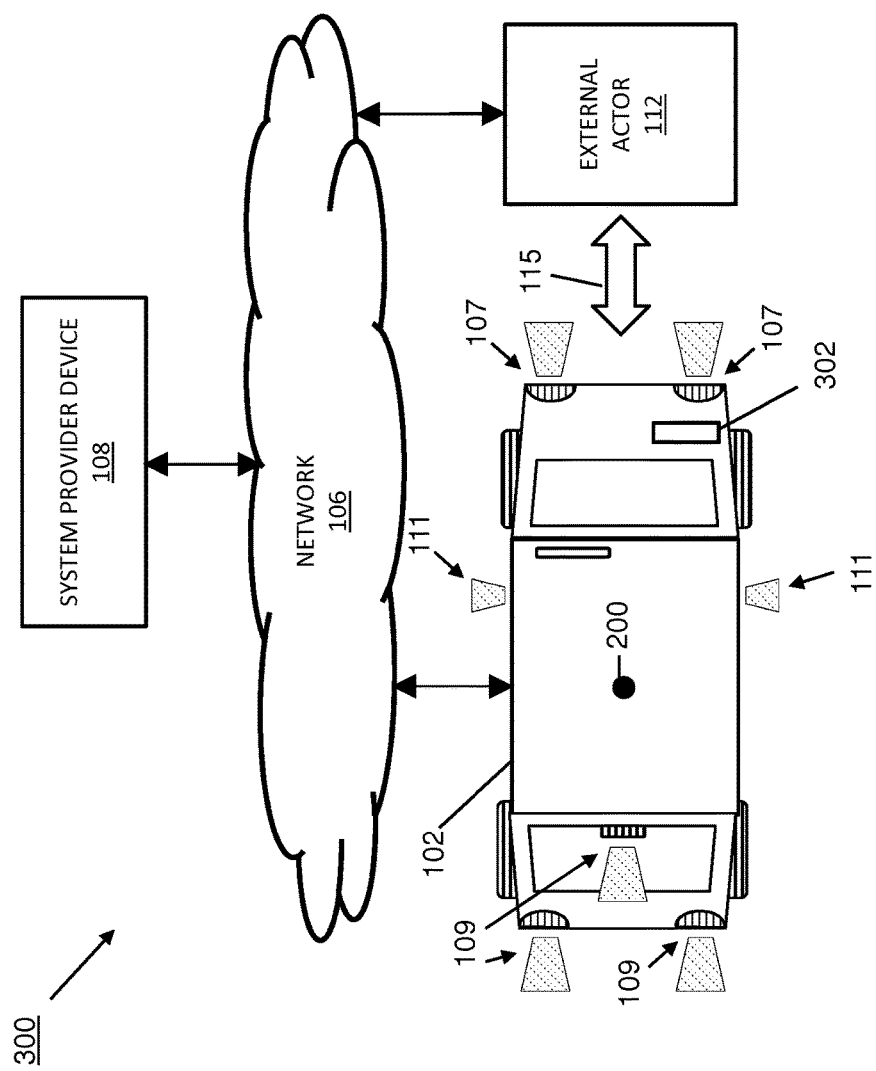
FIG. 3A is a schematic view illustrating an embodiment of the automotive optical communication system of FIG. 1 that includes at least one of the beacon devices of FIG. 2.
Figure 3B:
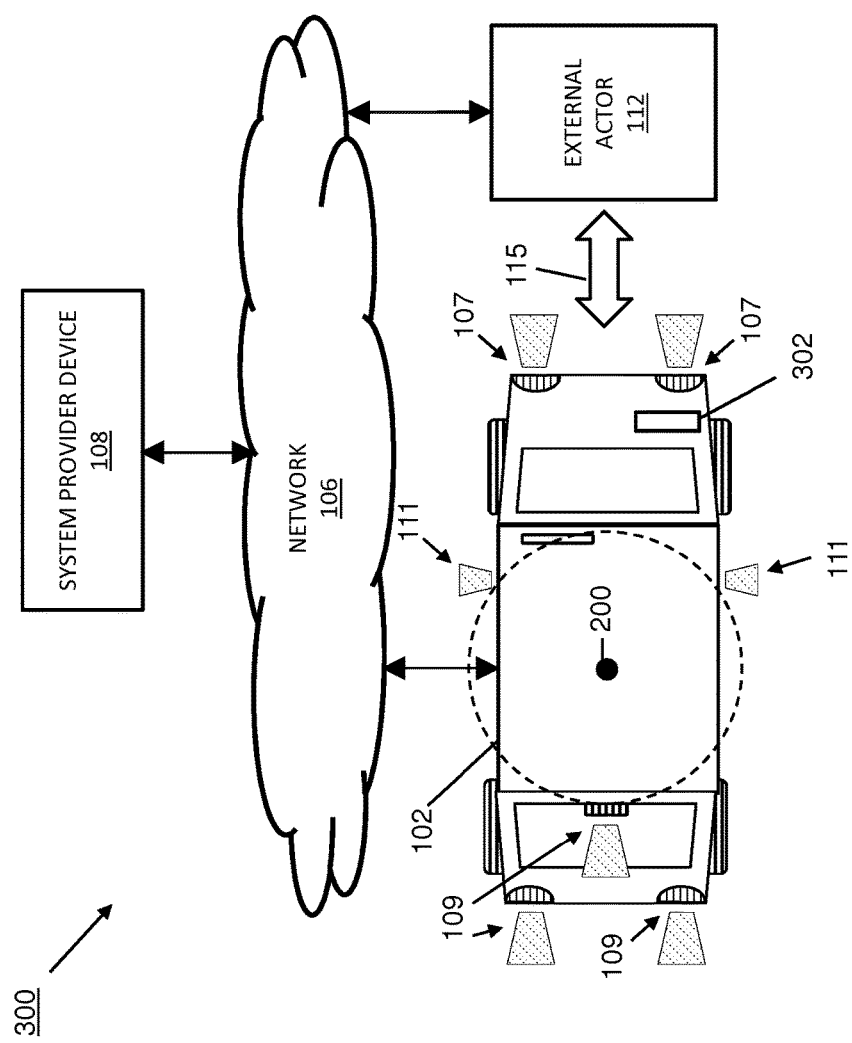
FIG. 3B is a schematic view illustrating an embodiment of the automotive optical communication system of FIG. 3A with the at least one beacon device providing a communication area.

Referring now to FIGS. 3A and 3B, an embodiment of an automotive optical communication system 300 is illustrated. As illustrated in FIG. 3A, the automotive optical communication system 300 may be provided by positioning at least one beacon device 200, discussed above with reference to FIG. 2, within or around the vehicle 102, discussed above with reference to FIG. 1. As discussed above, the beacon devices 200 may be sized such that they may be inconspicuously positioned virtually anywhere in or around the vehicle 102. The at least one beacon device 200 in the automotive optical communication system 300 may be configured to wirelessly communicate, via its first communications system 204, with a vehicle network communication device 302 such as, for example, a WiFi wireless router or other computing system connected to a network such as the Internet.

Referring now to FIG. 3B, in operation, the at least one beacon device 200 is configured to create a communication area 304 with its second communications system 208. For example, the second communications system 208 in the at least one beacon device 200 may be a BLE communications device that provides an approximately 100 foot radius communications area. Depending on a desired coverage area, the power of the at least one beacon device may be turned up or down to cover different sized areas. However, other communications systems providing other communications areas are envisioned as falling within the scope of the present disclosure. One of skill in the art in possession of the present disclosure will appreciate that different configurations of the at least one beacon device 200 in and around the vehicle 102 may be selected to cover any area within and around the vehicle 102 with a communications area 304.

As discussed in further detail below, the at least one beacon device 200 is configured to communicate with customer devices (e.g., devices of the driver and/or passengers 103, 105) within its respective communications area 304 (e.g., using the second communication system 208) to collect information, and then send that information to the vehicle network communication device 302 (e.g., using the first communication system 204) such that the data may be provided to a system provider device or an external actor device, which in some cases may include a merchant device, operating to provide the automotive optical communication system discussed below. In an embodiment, the at least one beacon device 200 may communicate with a database at the vehicle 102 to retrieve real-time merchant and/or customer information, as discussed in further detail below.

In some of the figures associated with the embodiments discussed below, the at least one beacon device 200 and its communications area 304 is not shown for the sake of clarity, but it should be understood that the communications and retrieval of information from beacon communication devices, and the provision of that information to a system provider device, may be accomplished using beacon devices providing communications areas such as the at least one beacon device 200 and communications area 304 illustrated in FIGS. 3A and 3B. While a specific example of an automotive optical communication system 300 is provided, one of skill in the art in possession of the present disclosure will recognize that a wide variety of different external actors at any of a plurality of different physical locations may incorporate beacon devices in a variety of different manners while remaining within its scope. It should also be noted that in some examples, communication between the vehicle 102 and any of a plurality user devices in the vehicle 102 may be accomplished without the use of beacon devices.

In the embodiments discussed below, the automotive optical communication systems and methods involve a system provider using a system provider device to detect and/or initiate events associated with communication between a vehicle (e.g., the vehicle 102) and an external actor (e.g., the external actor 112, which may include other vehicles, merchants, toll booths, road signs, service stations, and/or other entity as known in the art) by communicating, for example through the at least one beacon device 200, with customer devices (e.g., driver and/or passenger 103, 105 devices) and/or vehicle devices such as the vehicle network communication device 302. In some embodiments, a variety of customer data may be communicated from the customer devices to one or more vehicle devices (e.g., via the vehicle network communication device 302) and stored by a vehicle database for communication with the system device and/or external actor, as described above. In some embodiments, events associated with a communication between a vehicle (e.g., the vehicle 102) and an external actor (e.g., the external actor 112) may include purchase transaction events (e.g., paying a toll at a toll booth), vehicle telematics, authorization information, sensor and/or diagnostic information (e.g., at a service station), road and/or traffic information (e.g., construction, road closures, etc.), identification and/or registration information, and any other type of information as known in the art. In the case of purchase transaction events, the system provider device may also retrieve information related to one or more customer and/or merchant payment accounts. The system provider device may also store customer and/or merchant information (e.g., customer payment account information, customer payment preferences, merchant payment preferences, merchant offers, merchant physical locations, customer physical locations, customer-vehicle associations, etc.) in a database located at the vehicle 102, at a merchant physical location, or at another remote database, for example, by way of a network connection. In some embodiments, the system provider device may be a device that is local to the vehicle 102 and that communicates with the at least one beacon device 200 using the vehicle network communication device 302. In other embodiments, the system provider may be, for example, a payment service provider as discussed above.

Figure 4:
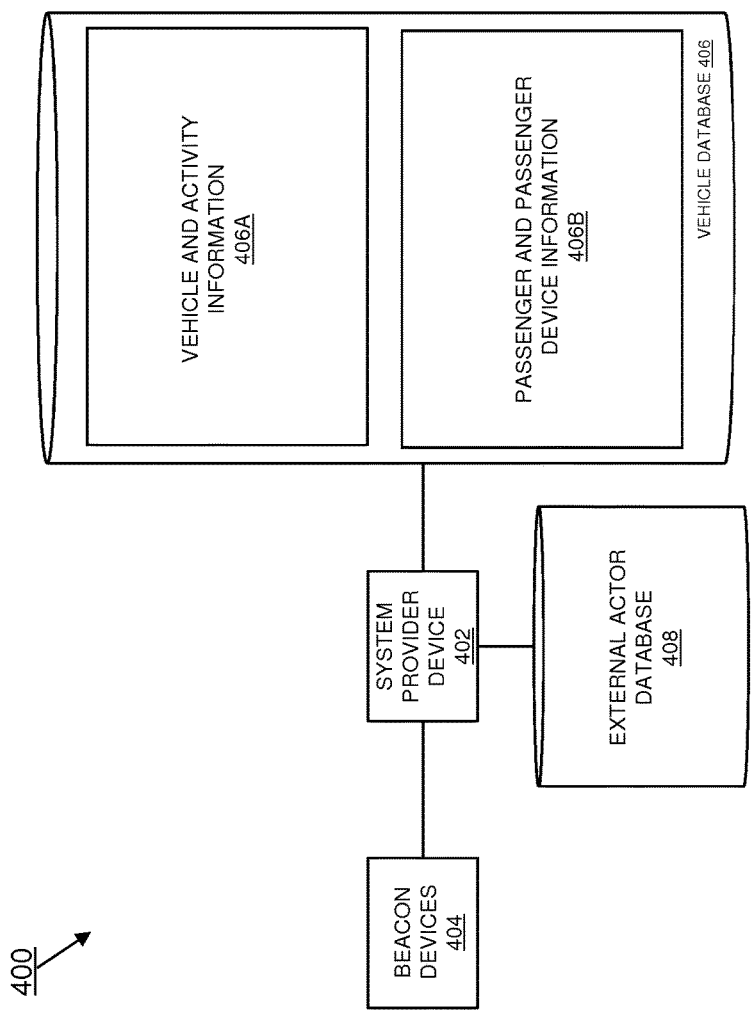
FIG. 4 is a schematic view illustrating an embodiment of a system provider device connected to beacon devices in the automotive optical communication system of FIG. 3 and to an external actor database and a vehicle database to provide an automotive optical communication system.

Referring to FIG. 4, an embodiment of a portion of an automotive optical communication system 400 is illustrated that may be used to implement one or more embodiments of the systems and methods of the present disclosure such as, for example, to detect and/or initiate events associated with communication between a vehicle (e.g., the vehicle 102) and an external actor (e.g., the external actor 112), as described below. The automotive optical communication system 400 includes a system provider device 402 communicatively coupled to one or more beacon devices 404 (which may be the beacon device 200 discussed above), a vehicle database 406, and an external actor database 408. While illustrated as single databases, the vehicle database 406 and external actor database 408 may include multiple databases that may be located at the vehicle 102 location and/or coupled to the system provider device 402 by a network (e.g., the Internet).

In an embodiment, the vehicle physical location database 406 may include vehicle and activity information 406A, as well as passenger and passenger device information 406B. The vehicle and activity information may include for example, a vehicle location, a vehicle type, vehicle identification and/or registration information, a listing of vehicle external illumination sources, vehicle telematics, authorization information, sensor and/or diagnostic information, a number of vehicle passengers, a listing of external optical communication activities with external actors, a list of external actors within vehicle communication range, a customer payment token associated with a customer payment account for example as copied from one or more passenger devices, a public and/or private key used to encrypt/decrypt a payment token, and/or other vehicle and vehicle activity information as known in the art. In some examples, the vehicle activity information may be updated in real-time as passengers enter and/or exit the range of the at least one beacon 200 within the vehicle 102, as transactions (e.g., purchases from external actors) are completed, and/or as one or more external actors comes into or goes out of vehicle communication range. The passenger and passenger device information may include passenger mobile device information (e.g., smartphone, tablet, laptop, etc.), passenger (i.e., customer) payment account information for example including payment token information, a public and/or private key used to encrypt/decrypt a payment token, passenger (i.e., customer) payment preferences, merchant payment preferences, merchant physical locations, passenger physical locations, and/or passenger-vehicle associations. Furthermore, the external actor database 408 may store a public and/or private key used to encrypt/decrypt a payment token (e.g., to decrypt a payment token received from the vehicle), vehicle and/or customer device information, customer purchase histories, customer preferences, and/or a variety of other information known in the art.

Figure 5:
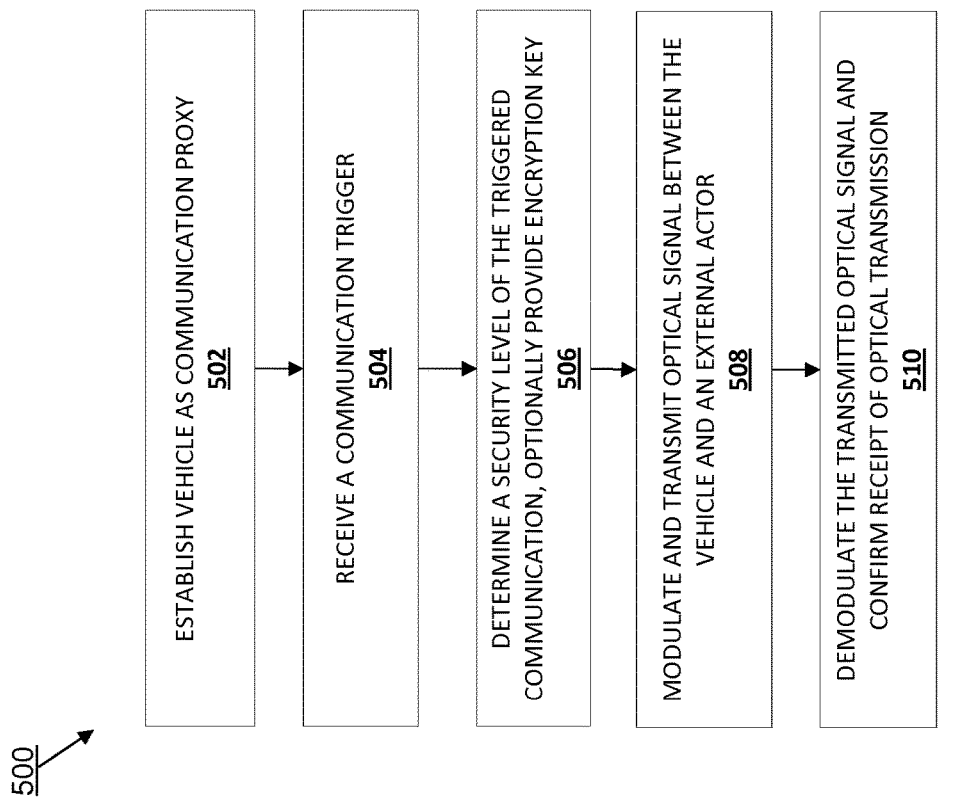
FIG. 5 is a flow chart illustrating an embodiment of a method for providing optical communication between a vehicle and an external actor.

Referring now to FIG. 5, an embodiment of a method 500 for optically communicating between a vehicle and an external actor is illustrated. One of skill in the art in possession of the present disclosure will recognize that the method 500 may be performed for a plurality of different vehicles communicating with any of a plurality of external actors at a variety of physical locations. The method 500 begins at block 502 where a vehicle is established as a communication proxy, for example, by the system provider device. In various embodiments, a passenger of the vehicle 602 may launch a system provider application and/or a payment service provider application (e.g., a payment application provided by PayPal, Inc. of San Jose, Calif.), for example, by way of an in-vehicle infotainment (IVI) system. In some embodiments, establishing the vehicle as a communications proxy includes pairing a user device (e.g., a smartphone) with the vehicle (e.g., by way of the IVI system). The user device pairing may also include authorization of the vehicle as a payment proxy, which may include storing a payment authorization token, payment credentials, an account authorization token, account credentials, and/or other payment or account preferences in a vehicle database (e.g., the vehicle database 406). In the embodiments discussed herein, payment from a customer payment account to a merchant payment account may be effectuated (e.g., by the system provider) by an actual payment transfer (e.g., provided for by the payment authorization token, payment credentials, etc.). Alternatively, in some embodiments, payment from a customer payment account to a merchant payment account may be effectuated (e.g., by the system provider) merely by an account authorization or account attribution (e.g., provided for by the account authorization token, account credentials, etc.). In other embodiments, establishing the vehicle as a communications proxy includes authorization of the vehicle to share and/or receive any of a plurality of other types of information such as vehicle telematics, sensor and/or diagnostic information, road and/or traffic information, and/or other information as known in the art.

Figure 6:
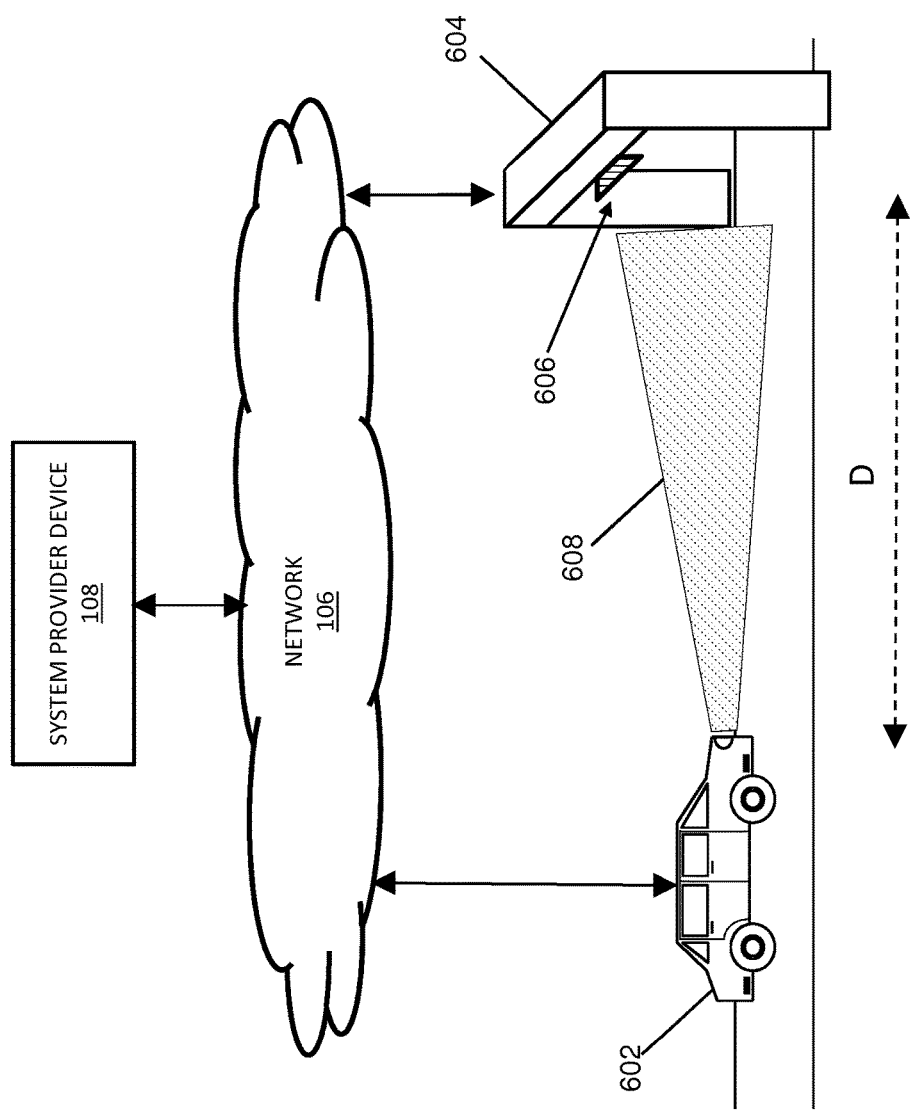
FIG. 6 is a schematic view illustrating an embodiment of an automotive optical communication system where an external actor includes a toll booth.

After establishing the vehicle as a communications proxy at block 502, the method 500 proceeds to block 504 where a communication trigger is received, for example, by the system provider device. With reference to FIGS. 6-10, various examples of the method 500 are illustrated and described. Referring first to FIG. 6, a vehicle 602 traveling toward (i.e., traveling in motion toward) a toll booth 604 is illustrated. With reference to block 504, and in some embodiments, the communication trigger may be manually initiated (e.g., by a driver of the vehicle 602, by an operator of the toll booth 604, or by the system provider). In other embodiments, the communication trigger may be triggered automatically, for example, based on a distance 'D' between the vehicle 602 and the toll booth 604. By way of example, the distance 'D' may be automatically determined by a global positioning system (GPS), by triangulation via cellular towers, or other techniques as known in the art. For purposes of discussion, in the example of FIG. 6, the communication trigger may be triggered automatically, as described above, when the vehicle 602 is within a distance 'D' of the toll booth 604.

The method 500 proceeds to block 506 where a security level of the triggered communication is determined by the service provider device. For example, in various embodiments, triggered communications associated with purchase transactions may be determined to be high security communications and may require data encryption or other security measures prior to data transmission. In some embodiments, other types of triggered communications such as those associated with vehicle telematics, sensor and/or diagnostic information, road and/or traffic information, and/or other generally informational communications may be determined to be low security communications and may be transmitted without prior data encryption or other security measures. For purposes of discussion, in the example of FIG. 6, the security level of the triggered communication is determined, by the service provider device, to be a high security communications. Thus, in some embodiments, the system provider and/or payment provider may provide an encryption key (e.g., a public or private key) via the network 106 to the vehicle 602. As described below, a payload (e.g., including a payment token) may be encrypted by the vehicle using the provided encryption key prior to optical transmission of information (e.g., optical transmission of the payment token) to the toll booth 604. Additionally, in some embodiments, the system provider and/or payment provider may provide the encryption key (e.g., a public or private key) via the network 106 to the toll booth 604 so that the toll booth 604 may decrypt the encrypted optical payload received from the vehicle 602. It should be noted that in various embodiments, the public key would be transmitted (i.e., provided) to either the vehicle 602 or the toll booth 604, where the public key is provided to encrypt a payload. The private key may be separately provided to a trusted party, where such a trusted party may in some embodiments include one or both of the vehicle 602 or the toll booth 604. The encrypted payload is then communicated (e.g., directly or indirectly) to a holder of the private key, where the private key can then be used to decrypt the payload encrypted with the public key. In some examples, information associated with an external actor (e.g., the toll booth 604) may be displayed by an IVI display within the vehicle 602. In the example of FIG. 6, information for the toll booth 604 (e.g., a toll rate), as well as information regarding a customer account balance, autopayment preference, or other account settings may be provided by the system and/or payment provider and displayed in the IVI display of the vehicle 602.

The method 500 proceeds to block 508 where an optical signal is modulated and transmitted between the vehicle and an external actor. Referring to FIG. 6, in an embodiment of block 508, a modulated optical signal 608 may be transmitted from the vehicle 602 to the toll booth 604. In various embodiments, the toll booth 604 includes one or more detectors 606, which are configured to detect the incoming modulated optical signal 608. In the example of FIG. 6, the optical signal 608 is provided by the forward illumination sources of the vehicle 602. However, in other embodiments discussed below, such a modulated optical signal may alternately be provided by either of the rear illumination sources or the lateral illumination sources of the vehicle 602. For purposes of discussion, modulation of the optical signal(s)

may be accomplished by any of a plurality of techniques. In some embodiments, any of the forward, rear, and/or lateral illumination sources may be modulated using amplitude, phase, and/or polarization modulation techniques such as, for example, on/off keying (OOK) modulation, differential phase shift keying (DPSK) modulation, differential quadrature phase shift keying (DQPSK) modulation, dual-polarization quadrature phase shift keying (DP-QPSK) modulation, and/or any other optical modulation techniques as known in the art. It should be noted that various embodiments of the modulation of an illumination source, as described herein, may be performed by modulation of the illumination source at a rate beyond a rate of human perception. In addition, modulation of any of the illumination sources described herein may include modulation of an illumination source intensity to sub-peak intensities. For example, in some embodiments, rather than simply modulation by toggling an illumination source between an ON/OFF state, the illumination source intensity may be modulated by a few percent (e.g., modulated between 95% and 100% intensity, modulated between 97% and 102% intensity, etc.). In various embodiments, by modulating at such sub-peak intensities, there will be no concern regarding any lack of lighting, for example, which driving a vehicle (e.g., the vehicle 602). While some examples of optical modulation techniques suitable for use with one or more of the present embodiments have been described, those of skill in the art in possession of the present disclosure will recognize other optical modulation techniques which may also be used without departing from the scope of this disclosure.

The method 500 proceeds to block 510 where the transmitted optical signal is demodulated and receipt of the optical transmission is confirmed by the system provider. For example, in various embodiments, the system provider may confirm receipt with the sender of the modulated optical signal, which in the present example includes the vehicle 602. Still with reference to FIG. 6, and as described above, the transmitted and modulated optical signal may include a payment token used to authorize payment from a customer payment account to a merchant (e.g., toll operator) payment account. In some embodiments, once the external actor (e.g., the toll booth 604) receives and unencrypts/demodulates the optical signal 608, the toll booth 604, in communication with the system and/or payment service provider may communicate to effectuate payment of the toll. In some embodiments, customer preferences (e.g., driver preferences) may include an auto-pay option, for example, for purchase transactions below a pre-defined threshold amount. By way of example, a customer may define a preference which includes automatic payment of any toll charge which is less than a pre-defined dollar amount (e.g., less than three dollars). In some cases, a customer payment account may not have sufficient funds to complete an auto-pay transaction, so the payment provider may communicate with a customer's bank account, PayPal account, or other source of funds in order to replenish the customer's payment account. In some embodiments, such account replenishment may occur automatically. In other embodiments, a prompt may be displayed in the vehicle 602 (e.g., via the IVI system) which confirms whether or not the customer would like to replenish their payment account (e.g., including an amount of money with which they would like to replenish their payment account). In some examples, even if the customer payment account has sufficient funds, the system and/or payment provider may prompt the customer (e.g., via the IVI system) for payment authorization, for example, if the payment amount (e.g., toll charge amount) exceeds a pre-defined spending limit as described above. In any case, once the payment is authorized, either automatically or manually by the customer, a purchase instruction may be sent to the system and/or payment provider to transfer funds from a customer payment account to a merchant payment account and thus effectuate payment (e.g., of a toll or other item, as described below).

Figure 7:
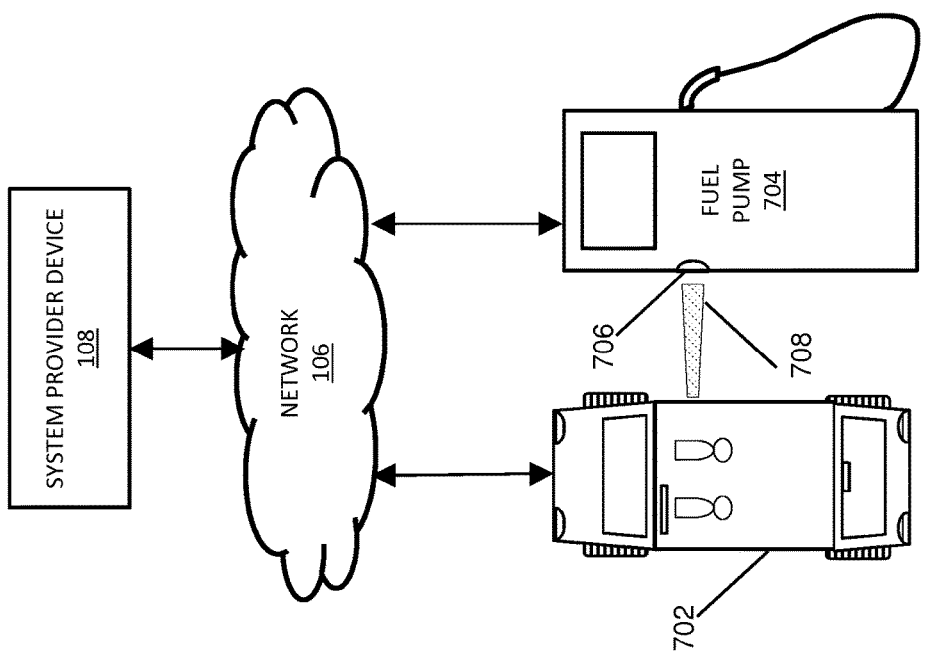
FIG. 7 is a schematic view illustrating an embodiment of an automotive optical communication system where an external actor includes a fuel pump.

Referring now to FIG. 7, an alternative embodiment of the method 500 for optically communicating between a vehicle and an external actor is illustrated. As in the example described above, and in an embodiment of block 502 of the method 500, a vehicle 702 is established as a communication proxy, for example, by the system provider device 108. A passenger of the vehicle 702 may launch a system provider application and/or a payment service provider application, and in some embodiments, may establish the vehicle as a communications proxy by pairing a user device with the vehicle. In some embodiments, the vehicle is established as a communications proxy by authorizing the vehicle, by the system provider, to share and/or receive any of a plurality of other types of information such as vehicle telematics, sensor and/or diagnostic information, road and/or traffic information, and/or other information as known in the art.

After establishing the vehicle 702 as a communications proxy, and in an embodiment of block 504, a communication trigger is received. Referring to the example of FIG. 7, the vehicle 702 parked at a service station next to fuel pump 704 is illustrated. In some examples, the fuel pump 704 also includes a sensor 706 configured to detect an optical signal transmitted from the vehicle 702. In some embodiments, the communication trigger is manually initiated (e.g., by a driver of the vehicle 702), for example, when the customer is ready to make a fuel purchase. In other embodiments, the communication trigger may be triggered automatically, for example, based on the proximity of the vehicle 702 to the fuel pump 704. In some embodiments, the proximity of the vehicle 702 may be detected by one or more beacon device 200, as described above, which may be deployed at various locations throughout the service station. In other examples, the proximity of the vehicle 702 to the service station and/or fuel pump 704 may be automatically determined by a GPS system, by triangulation via cellular towers, or by other techniques as known in the art.

In an embodiment of block 506 of the method 500, a security level of the triggered communication (e.g., between the vehicle 702 and the fuel pump 704) is determined, by the service provider device, to be a high security communication (e.g., due to the nature of the communication including a purchase transaction). Thus, in some embodiments, the system provider and/or payment provider may provide an encryption key (e.g., a public or private key) via the network 106 to the vehicle 702 as well as to the fuel pump 704, so that the fuel pump 704 may decrypt the encrypted optical payload received from the vehicle 702. In some examples, information associated with the fuel pump 704 may be displayed by an IVI display within the vehicle 704 (e.g., information such as a price of fuel, as well as information regarding a customer account balance, and/or other account settings). In alternative embodiments, low security information may also be transmitted to the fuel pump 704 and/or other service station device, for example, in order to transmit vehicle 702 sensor and/or diagnostic information, and/or other non-sensitive information, which may be used for example to diagnose potential and/or existing vehicle issues.

Still with reference to the example of FIG. 7, in an embodiment of block 508, a modulated optical signal 708 may be transmitted from the vehicle 702 to the fuel pump 704 and detected by the sensor 706. In the example of FIG. 7, the optical signal 708 is provided by the lateral illumination sources of the vehicle 702. However, in other embodiments discussed below, such a modulated optical signal may alternately be provided by either of the forward illumination sources or the rear illumination sources. In various embodiments, modulation of the optical signal 708 may be accomplished by any of a plurality of techniques, as discussed above.

In an embodiment of block 510, the transmitted optical signal 708 is demodulated and receipt of the optical transmission is confirmed by the system provider. For example, in various embodiments, the system provider may confirm receipt with the sender of the modulated optical signal, which in the example of FIG. 7 includes the vehicle 702. As with the example of FIG. 6, the transmitted and modulated optical signal 708 of FIG. 7 may include a payment token used to authorize payment from a customer payment account to a merchant (e.g., service station) payment account. In some embodiments, once the external actor (e.g., the service station, as represented herein by the fuel pump 704 portion of the service station) receives and unencrypts/demodulates the optical signal 708, the fuel pump 704, in communication with the system and/or payment service provider may communicate to effectuate payment of the fuel. In various embodiments, any of a plurality of customer preferences (e.g., of the vehicle 702) may be defined, as described above. In some embodiments, the payment provider may communicate with a customer's bank account, PayPal account, or other source of funds to complete a purchase transaction. Additionally, in some embodiments, a prompt may be displayed in the vehicle 702 (e.g., via the IVI system) which confirms whether or not the customer would like to complete/authorize a fuel purchase, replenish their payment account, transmit diagnostic information to the service station, and/or other such information and/or queries. Once payment to the service station (e.g., for fuel, service, etc.) is authorized, either automatically or manually by the customer, a purchase instruction may be sent to the system and/or payment provider to transfer funds from a customer payment account to a merchant payment account and thus effectuate payment (e.g., for the fuel).

Figure 8:
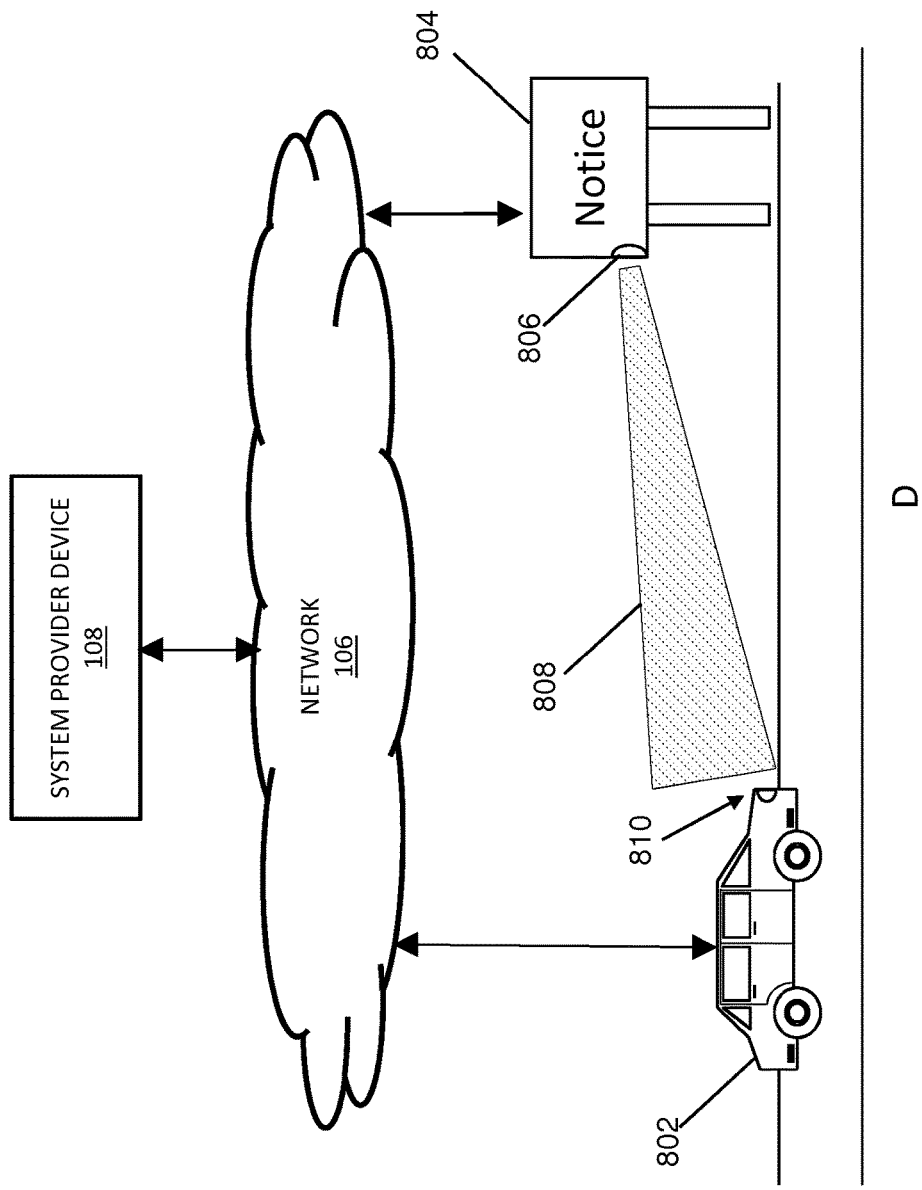
FIG. 8 is a schematic view illustrating an embodiment of an automotive optical communication system where an external actor includes a road sign.
Figure 9:
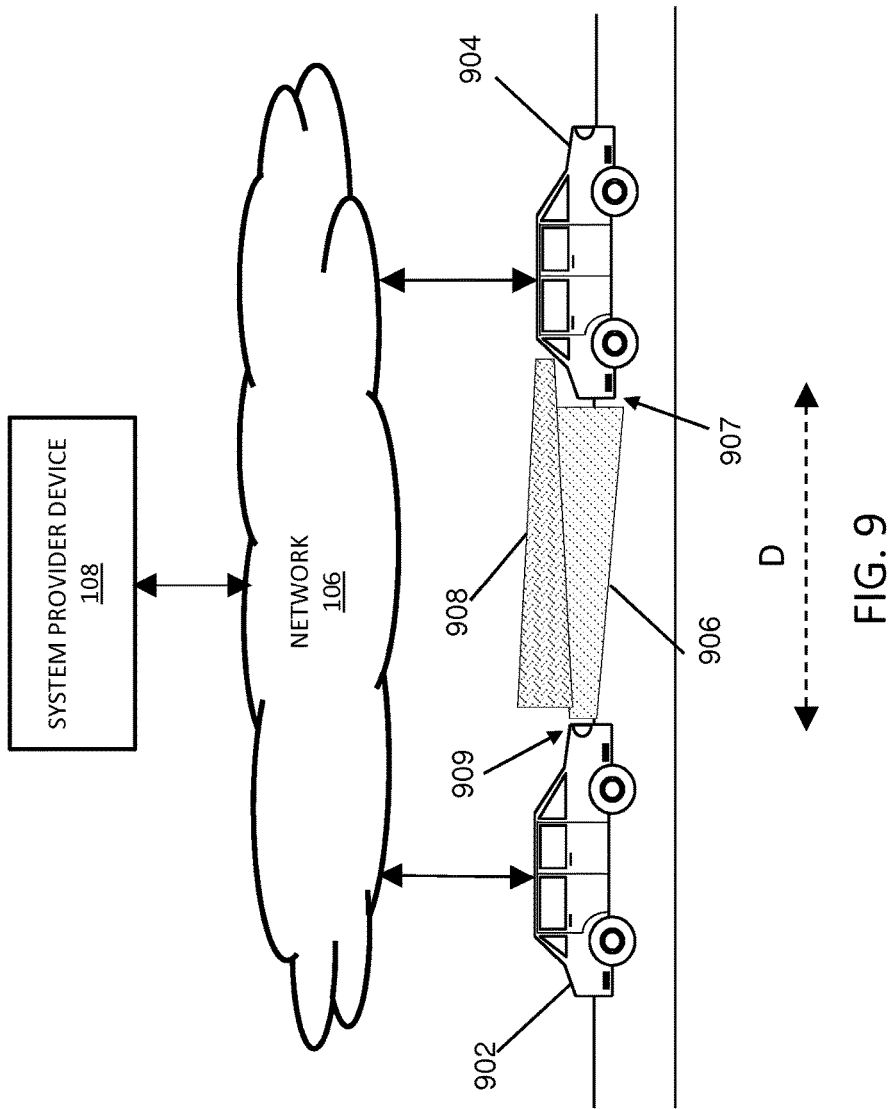
FIG. 9 is a schematic view illustrating an embodiment of an automotive optical communication system where an external actor includes another vehicle traveling in a forward and/or rear location.
Figure 10:
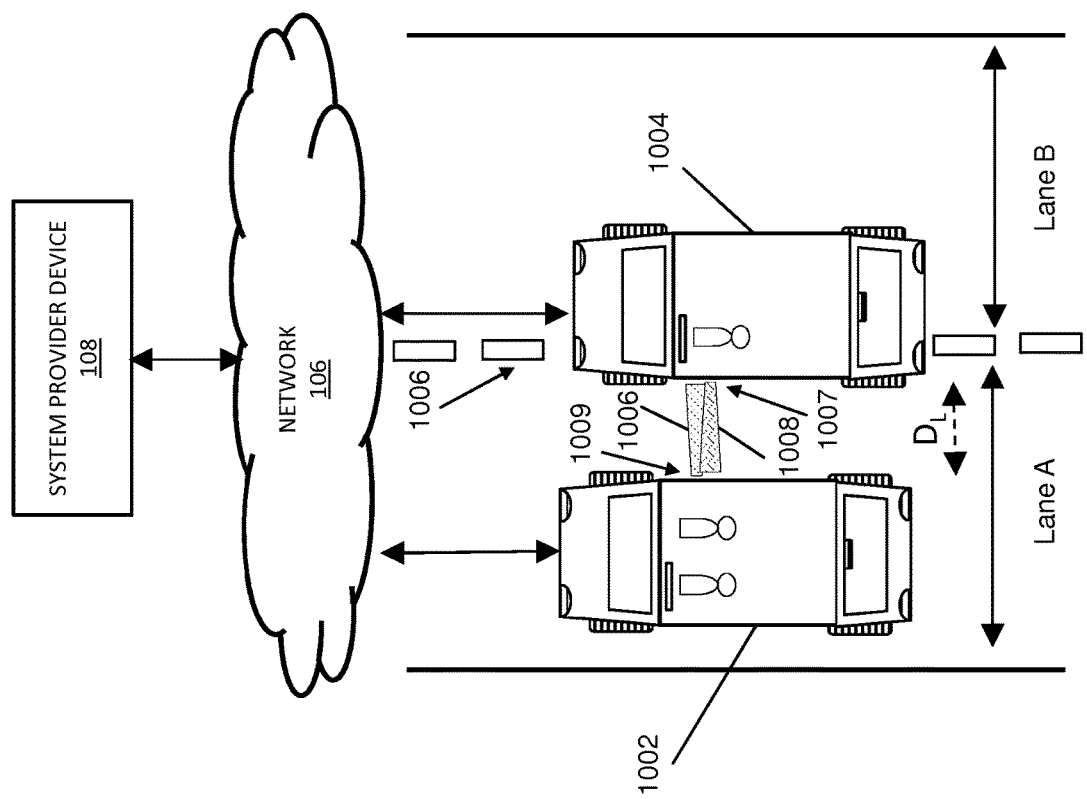
FIG. 10 is a schematic view illustrating an embodiment of an automotive optical communication system where an external actor includes another vehicle traveling in a lateral location.

Referring now to FIGS. 8-10, embodiments of the method 500 for optically communicating between a vehicle and an external actor, which may not necessarily use data encryption techniques, are illustrated. Referring first to FIG. 8, a vehicle 802 traveling toward (i.e., traveling in motion toward) a road sign 804 is illustrated. In an embodiment of block 502 of the method 500, the vehicle 802 may be established as a communication proxy, for example, by the system provider device 108, as described above.

After establishing the vehicle 802 as a communications proxy, and in an embodiment of block 504, a communication trigger is received. In the example of FIG. 8, the communication trigger may be triggered automatically, for example, based on a distance 'D' between the vehicle 802 and the road sign 804. As described above, the distance 'D' may be automatically determined by a GPS system, by triangulation via cellular towers, or by other techniques as known in the art. In various embodiments, the road sign 804 also includes an illumination source 806 configured to modulate and transmit an optical signal 808 to the vehicle 802, as described below. In some illustrative embodiments, rather than triggering communication (e.g., based on the distance 'D'), a signal from the road sign 804 may be sent unconditionally and repeatedly, relying upon a "field of projection" and strength of the illumination source 806 to limit receipt of the transmitted optical signal 808. Such an embodiment may, in some cases, preferentially decrease a system complexity.

In an embodiment of block 506, a security level of the triggered communication (e.g., between the road sign 804 and the vehicle 802) is determined, by the service provider device, to be a low security communication (e.g., that may not require data encryption). For example, the road sign 804 may be configured to transmit any of a plurality of informational messages such as road and/or lane closure information, detour information, construction information, accident information, restaurant/hotel/service station information, and/or other such information that would be useful to a driver and/or passenger of the vehicle 802.

In an embodiment of block 508, a modulated optical signal 808 may be transmitted from the road sign 804, by way of the illumination source 806, and detected by a sensor 810 which may be integrated within a front portion of the vehicle 802. In various embodiments, modulation of the optical signal 808 may be accomplished by any of a plurality of techniques, as discussed above.

In an embodiment of block 510, the transmitted optical signal 808 is demodulated and receipt of the optical transmission is confirmed by the system provider. For example, in various embodiments, the system provider may confirm receipt with the sender of the modulated optical signal, which in the example of FIG. 8 includes the road sign 804. In various embodiments, the information received from the road sign 804, by the optical signal 808, may be displayed in the vehicle 802 (e.g., via the IVI system) and thus complete delivery of a message to the driver and/or passenger(s) of the vehicle 802.

In at least one embodiment of the example of FIG. 8, consider that a customer (e.g., a driver of the vehicle 802) has previously made an online purchase from a local store and has selected an in-store pickup option. In some examples, the vehicle 802 may be detected by the road sign 804, as described above, or by a roadside beacon device embedded within, attached to, or otherwise coupled to the road sign 804. In some embodiments, upon detection of the vehicle 802, the system and/or payment provider may communicate (e.g., via the network 106) with the local store to alert the local store of the impending arrival of the vehicle 802 (and thus the customer). By doing so, the local store may pre-pull the customer's online purchase and thus have the item(s) ready for rapid pickup by the customer. In some cases, the local store may also include a drive-through whereby customers (e.g., such as the driver of the vehicle 802) may simply drive-through and pick up their purchased, and pre-pulled item(s), to further reduce pickup time and increase efficiency. In other examples, a customer (e.g., a driver of the vehicle 802) who may, or may have not, made any previous purchase from the local store may be detected (e.g., the vehicle 802 may be detected as described above), and the system and/or payment provider may push dynamic information to the vehicle 802, which may be displayed for example by an IVI system of the vehicle 802. In various embodiments, such dynamic information may include offers, coupons, advertisements, or other dynamic information related to the local store or, for example, any other approaching merchant(s).

FIGS. 9 and 10 illustrate examples of some embodiments which may be used to implement driver-assist and road safety technologies. While the examples of FIGS. 9 and 10 are illustrated and described for the case of two vehicles, it will be understood that the systems and methods described herein may be implemented for any of number of vehicles. Referring to FIG. 9, a vehicle 902 and a vehicle 904 traveling (e.g., traveling in motion) along a roadway is illustrated. In an embodiment of block 502 of the method 500, at least one of the vehicles 902, 904 is established as a communications proxy, for example, by the system provider device 108, as described above. In some embodiments, both of the vehicles 902, 904 are established as communication proxies.

After establishing one or both of the vehicles 902, 904 as communications proxies, and in an embodiment of block 504, at least one communication trigger is received. In the example of FIG. 9, the communication trigger may be triggered automatically, for example, based on a distance 'D' between the vehicle 902 and the vehicle 904. As described above, the distance 'D' may be automatically determined by a GPS system, by triangulation via cellular towers, or by other techniques as known in the art. In other embodiments, the communication trigger may be triggered automatically, for example, based on a speed at which the vehicle 902 or 904 is traveling (e.g., at a highway speed, above a threshold speed, etc.), based on an automatically determined vehicle location (e.g., on a highway or other major roadway), and/or based on a density of traffic (e.g., as determined by the system provider). While some examples of events which could cause a communication trigger have been described, one of skill in the art in possession of the present disclosure will understand that other events, automatically or manually initiated, may equally cause event triggers, while remaining within the scope of the present disclosure.

In an embodiment of block 506, a security level of the triggered communication (e.g., between the vehicle 902 and the vehicle 904) is determined, by the service provider device, to be a low security communication (e.g., that may not require data encryption). In various examples, each of the vehicles 902, 904 may be configured to transmit any of a plurality of informational messages such as velocity, acceleration rate, steering angle, electronic stability control information, driver fatigue, and/or other such information that would be useful to drivers of each of the vehicles 902, 904.

In an embodiment of block 508, a modulated optical signal 906 may be transmitted from the vehicle 902, by way of a forward illumination source (e.g., the forward illumination source 107), and detected by a sensor 907 which may be integrated within a rear portion of the vehicle 904. Likewise, a modulated optical signal 908 may be transmitted from the vehicle 904, by way of a rear illumination source (e.g., the rear illumination source 109), and detected by a sensor 909 which may be integrated within a front portion of the vehicle 902. In various embodiments, modulation of each of the optical signals 906, 908 may be accomplished by any of a plurality of techniques, as discussed above.

In an embodiment of block 510, the transmitted optical signals 906, 908 are demodulated and receipt of the optical transmission is confirmed by the system provider. For example, in various embodiments, the system provider may confirm receipt with the sender of the modulated optical signals, which in the example of FIG. 9 includes the vehicle 902 (for the optical signal 906) and the vehicle 904 (for the optical signal 908). In various embodiments, the information received by the vehicle 902, via the optical signal 908, and by the vehicle 904, via the optical signal 906, may be displayed within the vehicles 902, 904 (e.g., via an IVI system).

FIG. 10 illustrates a variant of the embodiment shown and described with reference to FIG. 9. In particular, FIG. 10 illustrates a vehicle 1002 traveling in a first lane (Lane A) and a vehicle 1004 traveling in a second lane (Lane B). As described above, and in an embodiment of block 502, one or both of the vehicles 1002, 1004 are established as communication proxies. With reference to FIG. 10, and in an embodiment of block 504, a communication trigger may be triggered automatically, for example, based on a lateral distance '$D_L$' between the vehicle 1002 and the vehicle 1004, based on an automatically determined vehicle location such as one of the vehicles being near a center stripe 1006 separating Lanes A/B, or such as one of the vehicles (e.g., the vehicle 1004) touching and/or crossing the center stripe 1006. Thus, in some examples, the communication trigger may be integrated with or communicative with a lane departure warning system of one or both of the vehicles 1002, 1004.

As in the example of FIG. 9, and in an embodiment of block 506, a security level of the triggered communication (e.g., between the vehicle 1002 and the vehicle 1004) is determined, by the service provider device, to be a low security communication (e.g., that may not require data encryption). In addition, as described above, each of the vehicles 1002, 1004 may be configured to transmit any of a plurality of informational messages such as velocity, acceleration rate, steering angle, electronic stability control information, driver fatigue, and/or other such information that would be useful to drivers of each of the vehicles 1002, 1004.

In an embodiment of block 508, a modulated optical signal 1006 may be transmitted from the vehicle 1002, by way of a lateral illumination source (e.g., the lateral illumination source 111), and detected by a sensor 1007 which may be integrated within a lateral portion of the vehicle 1004. Similarly, a modulated optical signal 1008 may be transmitted from the vehicle 1004, by way of a lateral illumination source, and detected by a sensor 1009 which may be integrated within a lateral portion of the vehicle 1002. In various embodiments, modulation of each of the optical signals 1006, 1008 may be accomplished by any of a plurality of techniques, as discussed above.

In an embodiment of block 510, the transmitted optical signals 1006, 1008 are demodulated and receipt of the optical transmission is confirmed by the system provider. For example, in various embodiments, the system provider may confirm receipt with the sender of the modulated optical signals, which in the example of FIG. 10 includes the vehicle 1002 (for the optical signal 1006) and the vehicle 1004 (for the optical signal 1008). In various embodiments, the information received by the vehicle 1002, via the optical signal 1008, and by the vehicle 1004, via the optical signal 1006, may be displayed within the vehicles 1002, 1002 (e.g., via an IVI system).

While various examples of the method 500 have been illustrated and described above, it is noted that such examples are merely illustrative and the present disclosure is not meant to be limited in any way, beyond by the claims that follow. Moreover, while various illustrations of several embodiments have been discussed (e.g., as in FIGS. 6-10), it is further understood that those skilled in the art in possession of the present disclosure will recognize alternative examples, implementations, and/or or embodiments of the automotive optical communication system described herein, without departing from the scope of the disclosure. For example, in addition to payment of tolls and fuel, as described above, some embodiments may be used for payment at a parking garage, at a parking kiosk/meter, at a ferry, at a drive-through restaurant, and/or any of a plurality of other merchant types and/or merchant locations. In addition, some embodiments may include the use of a limited payment token paired to a vehicle (e.g., stored in a vehicle database), for example, where only limited, authorized purchases such as fuel and/or tolls may be paid using the limited payment token. In other examples, some embodiments may be used to mitigate traffic congestion, to prioritize emergency response vehicles (e.g., detect emergency vehicle, and brake and/or move out of the way), to yield and/or stop for pedestrians, etc., for example, by enabling a vehicle to be 'aware' of its environment and thereby notify a driver and/or in some cases, self-navigate. In yet other examples, embodiments of the present disclosure may be used for other driver and/or vehicle identification purposes such as an in-motion remote authentication (e.g., in an express lane, in a pre-validated vehicle program such as at a border crossing, etc.) and/or to open a garage door, a gated community entrance, and/or other secure location. In some embodiments, other types of data may also be transferred using the systems and methods described herein such as cargo manifests, vehicle weights, vehicle destination, engine type, real-time emission data, and/or any of a plurality of other such vehicle, cargo, or passenger information. Additionally, in some cases, a vehicle may be configured to be in a 'receiving mode', where such a vehicle is continuously listening for/detecting any of a plurality of optical signals at a vehicle sensor. For example, referring to the illustrations of FIGS. 8-10, any of the vehicles illustrated therein may be configured to be in such a 'receiving mode', such that the vehicle 802 (FIG. 8) is continuously listening for/detecting an optical signal (such as that transmitted from the road sign 804); such that the vehicle 902 and/or the vehicle 904 (FIG. 9) is continuously listening for/detecting an optical signal (such as that transmitted from the other vehicle); or such that the vehicle 1002 and/or the vehicle 1004 (FIG. 10) is continuously listening for/detecting an optical signal (such as that transmitted from the other vehicle).

Thus, systems and methods have been described that provide for optical communication between a vehicle and an external actor. For example, and in accordance with the various embodiments described herein, a vehicle may be configured to, by any of a forward, rear, and/or lateral illumination sources, transmit any of a plurality of payloads to any of a plurality of external actors. The vehicle may likewise be configured to, by any of a forward, rear, and/or lateral sensor/detector, detect any of a plurality of payloads transmitted by any of the plurality of external actors. In some embodiments, the systems and methods described herein may be used to facilitate purchase transactions between a vehicle (e.g., including a vehicle driver and/or passenger) and any of a plurality of merchants, at any of a variety of merchant locations. Additionally, in some embodiments, the systems and methods described herein may be used to transmit and/or receive, by a vehicle, vehicle telematics, authorization information, sensor and/or diagnostic information, road and/or traffic information, identification and/or registration information, and any other type of information as known in the art.

Figure 11:
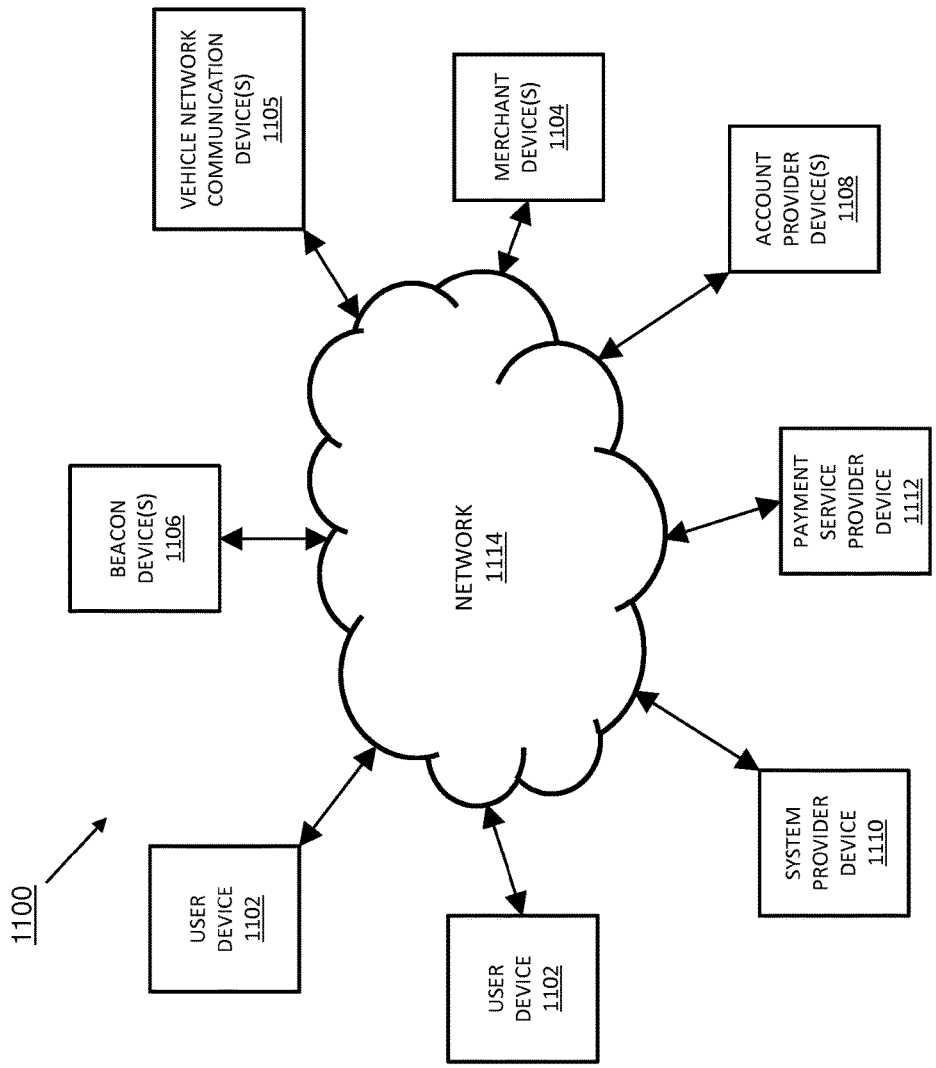
FIG. 11 is a schematic view illustrating an embodiment of a networked system.

Referring now to FIG. 11, an embodiment of a network-based system 1100 for implementing one or more processes described herein is illustrated. As shown, the network-based system 1100 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 11 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 1100 illustrated in FIG. 11 includes a plurality of user devices 1102 (e.g., customer devices), vehicle network communication device(s) 1105, merchant device(s) 1104, beacon device(s) 1106, a payment service provider device 1112, account provider device(s) 1108, and/or a system provider device 1110 in communication over one or more networks 1114. The user devices 1102 may be the user devices discussed above and may be operated by the users (e.g., customers) discussed above. The vehicle network communication device(s) 1105 may be the vehicle network communication devices discussed above and may be operated by and/or implemented within the vehicles discussed above. The beacon device(s) 1106 may be the beacon devices discussed above and may be operated by and/or implemented within the vehicles discussed above or otherwise implemented as discussed above (e.g., roadside beacons). The merchant devices 1104 may be the merchant devices discussed above and may be operated by the merchants discussed above. The payment service provider device 1112 may be the payment service provider devices discussed above and may be operated by a payment service provider such as, for example, PayPal Inc. of San Jose, Calif. The system provider devices 1110 may be the system provider devices discussed above and may be operated by the system providers discussed above. The account provider devices 1108 may be operated by credit card account providers, bank account providers, savings account providers, and a variety of other account providers known in the art.

The user devices 1102, vehicle network communication device(s) 1105, merchant device(s) 1104, beacon device(s) 1106, payment service provider device 1112, account provider devices 1108, and/or system provider device 1110 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 1100, and/or accessible over the network 1114.

The network 1114 may be implemented as a single network or a combination of multiple networks. For example, in various embodiments, the network 1114 may include the Internet and/or one or more intranets, landline networks, wireless networks, and/or other appropriate types of networks.

The user devices 1102 may be implemented using any appropriate combination of hardware and/or software configured for wired and/or wireless communication over network 1114. For example, in one embodiment, the user devices 1102 may be implemented as a personal computer of a user in communication with the Internet. In other embodiments, the user devices 1102 may be a smart phone, wearable computing device, laptop computer, and/or other types of computing devices.

The user devices 1102 may include one or more browser applications which may be used, for example, to provide a convenient interface to permit the user (e.g., the customer) to browse information available over the network 1114. For example, in one embodiment, the browser application may be implemented as a web browser configured to view information available over the Internet.

The user devices 1102 may also include one or more toolbar applications which may be used, for example, to provide user-side processing for performing desired tasks in response to operations selected by the customer. In one embodiment, the toolbar application may display a user interface in connection with the browser application.

The user devices 1102 may further include other applications as may be desired in particular embodiments to provide desired features to the user devices 1102. In particular, the other applications may include a payment application for payments assisted by a payment service provider through the payment service provider device 1112. The other applications may also include security applications for implementing user-side security features, programmatic user applications for interfacing with appropriate application programming interfaces (APIs) over the network 1114, or other types of applications. Email and/or text applications may also be included, which allow customer payer to send and receive emails and/or text messages through the network 1114. The user devices 1102 includes one or more user and/or device identifiers which may be implemented, for example, as operating system registry entries, cookies associated with the browser application, identifiers associated with hardware of the user devices 1102, or other appropriate identifiers, such as a phone number. In one embodiment, the user identifier may be used by the payment service provider device 1112 and/or account provider device 1108 to associate the user with a particular account as further described herein. In various embodiments, the vehicles described herein (e.g., by way of pairing of a vehicle to a user device) may likewise include any of the plurality of features and/or components of the user devices 1102 described above. Thus, in various embodiments, the vehicles described herein may be capable of executing similar applications, communicating over the network 1114, and/or performing any of the plurality of functions as the user devices 1102.

The merchant devices 1104 may be maintained, for example, by a conventional or on-line merchant, conventional or digital goods seller, individual seller, government entity, and/or application developer offering various products and/or services in exchange for payment to be received conventionally or over the network 1114. In this regard, the merchant device 1104 may include a database identifying available products and/or services (e.g., collectively referred to as items) which may be made available for viewing and purchase by the customer.

The merchant devices 1104 also include a checkout application which may be configured to facilitate the purchase by the payer of items. The checkout application may be configured to accept payment information from the user through the user devices 1102, as well as through a vehicle paired to a user device (e.g., through the vehicle network communication device(s) 1105), the account provider through the account provider device 1108, and/or from the payment service provider through the payment service provider device 1112 over the network 1114.

Figure 12:
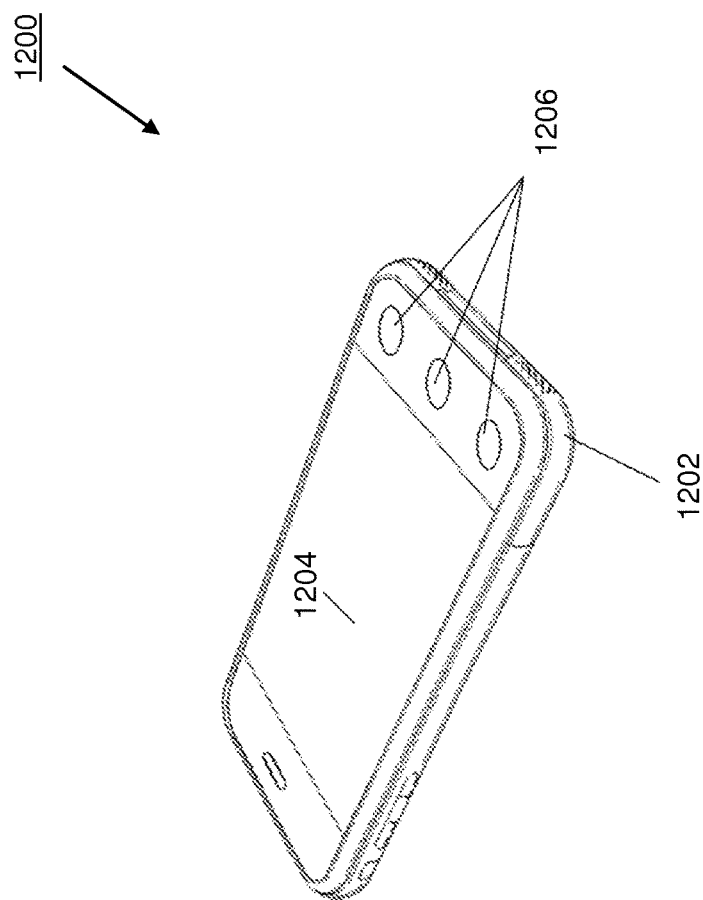
FIG. 12 is a perspective view illustrating an embodiment of a customer device.

Referring now to FIG. 12, an embodiment of a user device 1200 is illustrated. The user device 1200 may be the user device 1102 discussed above, which in some cases may be paired to a vehicle. The user device 1200 includes a chassis 1202 having a display 1204 and an input device including the display 1204 and a plurality of input buttons 1206. One of skill in the art will recognize that the user device 1200 is a portable or mobile phone including a touch screen input device and a plurality of input buttons that allow the functionality discussed above with reference to the methods above. However, a variety of other portable/mobile customer devices and/or desktop customer devices may be used in the methods discussed above without departing from the scope of the present disclosure.

Figure 13:
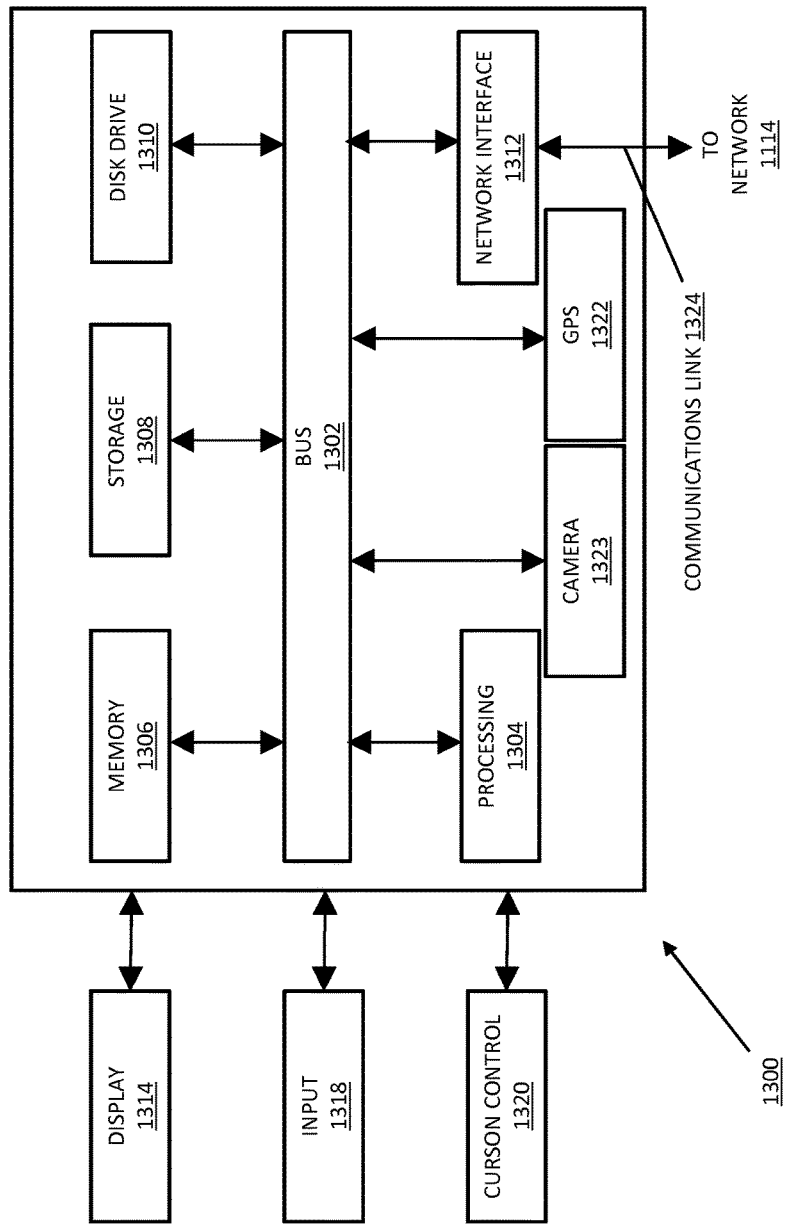
FIG. 13 is a schematic view illustrating an embodiment of a computer system.

Referring now to FIG. 13, an embodiment of a computer system 1300 suitable for implementing, for example, the user devices 1102, 1200, the vehicle network communication device(s) 302, 1105, the merchant device(s) 606, 704, 804, 1104, beacon device(s) 200, 404, 1106, payment service provider device 1112, account provider devices 1108, and/or system provider device 108, 402, 1110, is illustrated. It should be appreciated that other devices utilized by users (including customers), vehicles including vehicle network communication device(s), external actors including merchants, beacon devices, payment service providers, account provider device(s), and/or system providers in the system discussed above may be implemented as the computer system 1300 in a manner as follows.

In accordance with various embodiments of the present disclosure, computer system 1300, such as a computer and/or a network server, includes a bus 1302 or other communication mechanism for communicating information, which interconnects subsystems and components, such as a processing component 1304 (e.g., processor, micro-controller, digital signal processor (DSP), etc.), a system memory component 1306 (e.g., RAM), a static storage component 1308 (e.g., ROM), a disk drive component 1310 (e.g., magnetic or optical), a network interface component 1312 (e.g., modem or Ethernet card), a display component 1314 (e.g., CRT or LCD), an input component 1318 (e.g., keyboard, keypad, or virtual keyboard), a cursor control component 1320 (e.g., mouse, pointer, or trackball), a location determination component 1322 (e.g., a Global Positioning System (GPS) device as illustrated, a cell tower triangulation device, and/or a variety of other location determination devices known in the art), and/or a camera component 1323. In one implementation, the disk drive component 1310 may comprise a database having one or more disk drive components.

In accordance with embodiments of the present disclosure, the computer system 1300 performs specific operations by the processor 1304 executing one or more sequences of instructions contained in the memory component 1306, such as described herein with respect to the user devices 1102, 1200, the vehicle network communication device(s) 302, 1105, the merchant device(s) 606, 704, 804, 1104, beacon device(s) 200, 404, 1106, payment service provider device 1112, account provider devices 1108, and/or system provider device 108, 402, 1110. Such instructions may be read into the system memory component 1306 from another computer readable medium, such as the static storage component 1308 or the disk drive component 1310. In other embodiments, hard-wired circuitry may be used in place of or in combination with software instructions to implement the present disclosure.

Logic may be encoded in a computer readable medium, which may refer to any medium that participates in providing instructions to the processor 1304 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1310, volatile media includes dynamic memory, such as the system memory component 1306, and transmission media includes coaxial cables, copper wire, and fiber optics, including wires that comprise the bus 1302.

In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1300. In various other embodiments of the present disclosure, a plurality of the computer systems 1300 coupled by a communication link 1324 to the network 1114 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1300 may transmit and receive messages, data, information and instructions, including one or more programs (i.e., application code) through the communication link 1324 and the network interface component 1312. The network interface component 1312 may include an antenna, either separate or integrated, to enable transmission and reception via the communication link 1324. Received program code may be executed by processor 1304 as received and/or stored in disk drive component 1310 or some other non-volatile storage component for execution.

Figure 14:
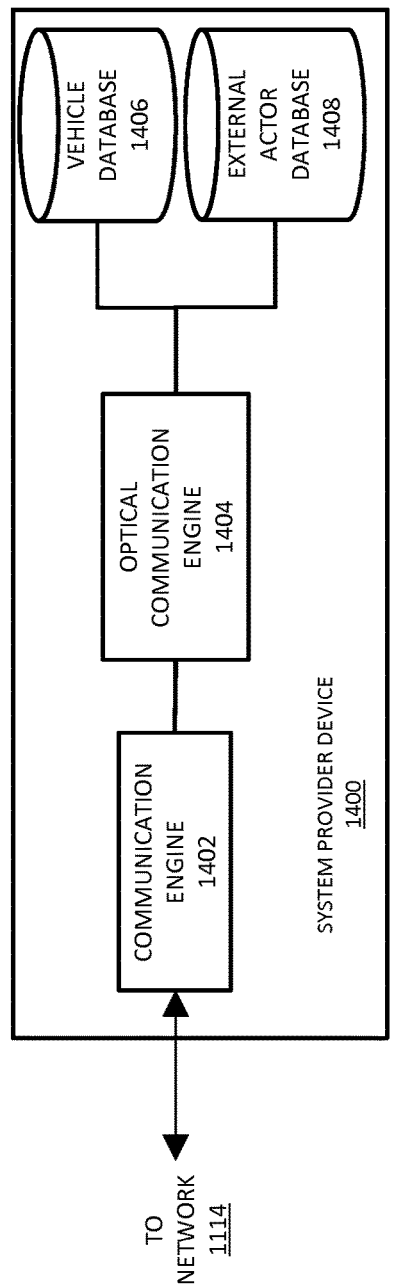
FIG. 14 is a schematic view illustrating an embodiment of a system provider device.

Referring now to FIG. 14, an embodiment of a system provider device 1400 is illustrated. In an embodiment, the device 1400 may be the system provider devices discussed above. The device 1400 includes a communication engine 1402 that is coupled to the network 1114 and to an optical communication engine 1404 that is coupled to a vehicle database 1406 and an external actor database 1408. The communication engine 1402 may be software or instructions stored on a computer-readable medium that allows the device 1400 to send and receive information over the network 1114. The optical communication engine 1404 may be software or instructions stored on a computer-readable medium that, when executed by a processor, is configured to establish a vehicle as a communication proxy, receive a communication trigger, determine a security level of the triggered communication and optionally provide an encryption key, modulate and transmit an optical signal between the vehicle and an external actor, demodulate the transmitted optical signal and confirm receipt of the optical transmission, as well as provide any of the other functionality that is discussed above. While the databases 1406 and 1408 have been illustrated as located in the device 1400, one of skill in the art will recognize that they may be connected to the optical communication engine 1404 through the network 1114 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, some of the above embodiments have focused on merchants and customers; however, a customer or consumer can pay, or otherwise interact with any type of recipient, including charities and individuals. The payment does not have to involve a purchase, but may be a loan, a charitable contribution, a gift, etc. Thus, merchant as used herein can also include charities, individuals, and any other entity or person receiving a payment from a customer. Having thus described embodiments of the present disclosure, persons of ordinary skill in the art will recognize that changes may be made in form and detail without departing from the scope of the present disclosure. Thus, the present disclosure is limited only by the claims that follow.

What is claimed is:

1. A system, comprising:
 a non-transitory memory; and
 one or more hardware processors coupled to the non-transitory memory and configured to read instructions from the non-transitory memory to cause the system to perform operations comprising:
  receiving a communication trigger over a network having at least one vehicle as a communication proxy;
  in response to receiving the communication trigger, transmitting a modulated optical signal, from a vehicle illumination source of one of the at least one vehicle or an external actor, to the other of the at least one vehicle or the external actor, respectively, wherein the modulated optical signal includes a sub-peak intensity modulation of light emitted from the vehicle illumination source;
  detecting, by a sensor at the other of the at least one vehicle or the external actor, the modulated optical signal; and
  demodulating the modulated optical signal detected by the sensor.

2. The system of claim 1, wherein the operations further comprise:
 in response to receiving the communication trigger, determining a security level of the triggered communication.

3. The system of claim 2, wherein the operations further comprise:
 determining a first security level of the triggered communication; and
 in response to determining the first security level, providing an encryption key to the at least one vehicle or the external actor.

4. The system of claim 3, wherein the operations further comprise:

responsive to determining the first security level of the triggered communication, encrypting the modulated optical signal using the encryption key; and transmitting the encrypted optical signal, from the illumination source of the one of the at least one vehicle or the external actor, to the other of the at least one vehicle or the external actor, respectively.

5. The system of claim 1, wherein the operations further comprise pairing the at least one vehicle with a user device.

6. The system of claim 5, wherein the pairing the at least one vehicle with the user device includes storing, in a vehicle database, at least one of a payment authorization token, payment credentials, an account authorization token, account credentials, payment preferences, or account preferences.

7. The system of claim 1, wherein the operations further comprise authorizing the at least one vehicle to transmit to the external actor, or receive from the external actor, at least one of vehicle telematics, sensor information, diagnostic information, road information, or traffic information.

8. The system of claim 1, wherein the receiving the communication trigger over the network includes receiving at least one of a manually initiated communications trigger or an automatically initiated communications trigger.

9. The system of claim 8, wherein the receiving the automatically initiated communications trigger is based on a determined location of the at least one vehicle.

10. The system of claim 4, wherein the operations further comprise:
unencrypting the transmitted optical signal; and
effectuating a payment from a customer payment account to a merchant payment account.

11. The system of claim 1, wherein the sub-peak intensity modulation of light emitted from the vehicle illumination source comprises modulating the light between 95% and 100% intensity.

12. A method, comprising:
receiving, by a system provider device, a communication trigger through a network having at least one vehicle as a communication proxy;
in response to receiving the communication trigger, transmitting, by the system provider device, a modulated optical signal, via a vehicle illumination source of one of the at least one vehicle or an external actor, to the other of the at least one vehicle or the external actor, respectively, wherein the modulated optical signal includes a sub-peak intensity modulation of light emitted from the vehicle illumination source;
detecting, by the system provider device and a sensor, at the other of the at least one vehicle or the external actor, the modulated optical signal; and
demodulating, by the system provider device, the modulated optical signal detected by the sensor.

13. The method of claim 12, further comprising:
determining, by the system provider device, a first security level of the triggered communication; and
in response to determining the first security level, providing, by the system provider device, an encryption key to the at least one vehicle or the external actor.

14. The method of claim 13, further comprising:
in response to determining the first security level of the triggered communication, encrypting, by the system provider device, the modulated optical signal using the encryption key; and transmitting, by the system provider device, the encrypted optical signal, from the illumination source of the one of the at least one vehicle or the external actor, to the other of the at least one vehicle or the external actor, respectively.

15. The method of claim 14, further comprising:
unencrypting, by the system provider device, the transmitted optical signal; and
effectuating a payment, by the system provider device, from a customer payment account to a merchant payment account.

16. The method of claim 12, further comprising:
pairing, by the system provider device, the at least one vehicle with a user device, wherein the pairing the at least one vehicle with the user device includes storing, in a vehicle database, at least one of a payment authorization token, payment credentials, an account authorization token, account credentials, payment preferences, or account preferences.

17. The method of claim 12, further comprising:
authorizing, by the system provider device, the at least one vehicle to transmit to the external actor, or receive from the external actor, at least one of vehicle telematics, sensor information, diagnostic information, road information, or traffic information.

18. A non-transitory machine-readable medium having stored thereon machine-readable instructions executable to cause a machine to perform operations comprising:
receiving a communication trigger;
responsive to receiving the communication trigger, transmitting a modulated optical signal, from a vehicle illumination source of one of at least one vehicle or an external actor, to the other of the at least one vehicle or the external actor, respectively, wherein the modulated optical signal includes a sub-peak intensity modulation of light emitted from the vehicle illumination source;
detecting, by a sensor at the other of the at least one vehicle or the external actor, the modulated optical signal; and
demodulating the modulated optical signal detected by the sensor.

19. The non-transitory machine-readable medium of claim 18, wherein the operations further comprise:
determining a first security level of the triggered communication; and
responsive to determining the first security level, providing an encryption key to the at least one vehicle or the external actor.

20. The non-transitory machine-readable medium of claim 19, wherein the operations further comprise:
in response to determining the first security level of the triggered communication, encrypting the modulated optical signal using the encryption key; and
transmitting the encrypted optical signal, from the illumination source of the one of the at least one vehicle or the external actor, to the other of the at least one vehicle or the external actor.

21. The non-transitory machine-readable medium of claim 20, wherein the operations further comprise:
unencrypting the transmitted optical signal; and
effectuating a payment from a customer payment account to a merchant payment account.

* * * * *